UNITED STATES PATENT OFFICE.

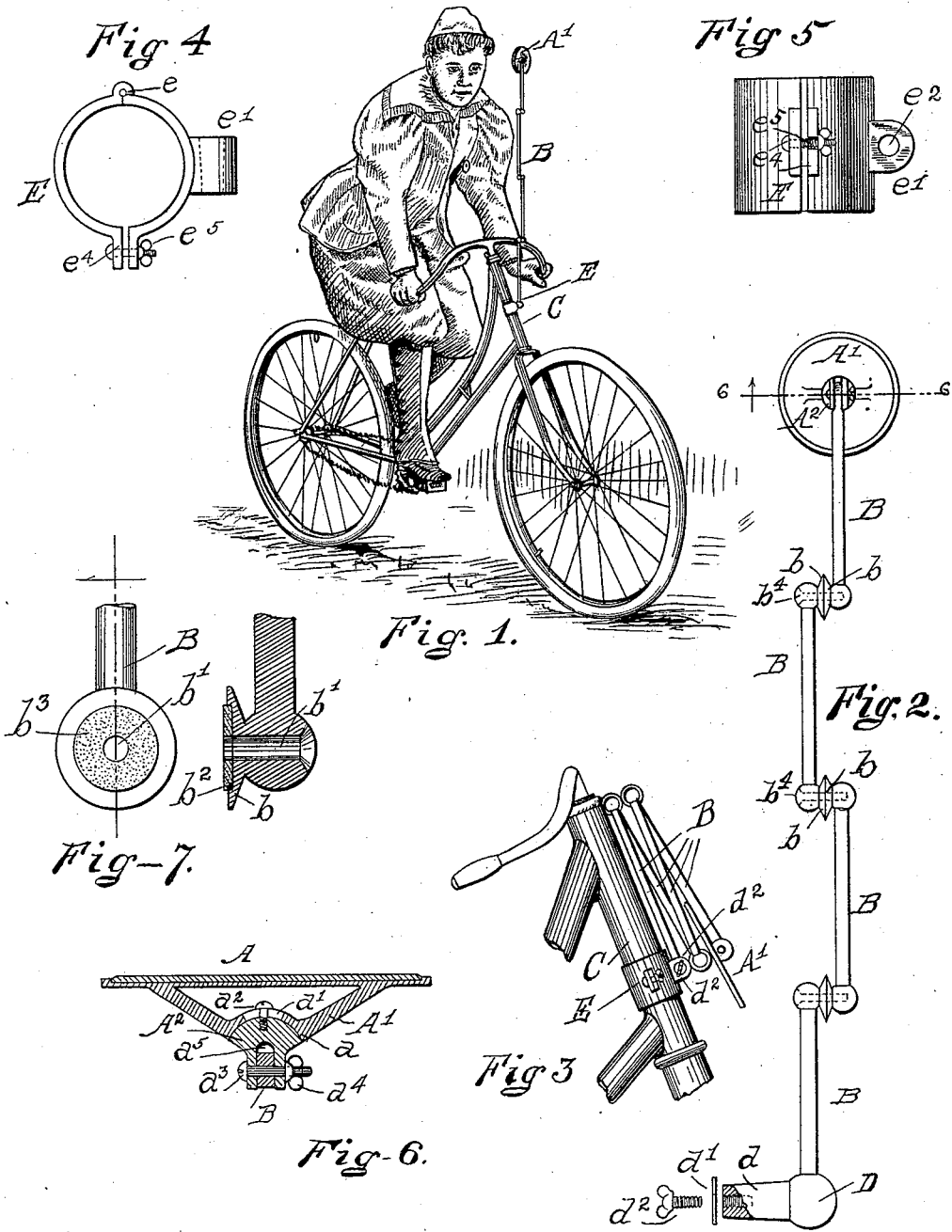

FRANK RYAN, OF SPRINGFIELD, ILLINOIS.

ADJUSTABLE MIRROR FOR BICYCLES.

SPECIFICATION forming part of Letters Patent No. 564,454, dated July 21, 1896.

Application filed August 3, 1895. Serial No. 558,121. (No model.)

*To all whom it may concern:*

Be it known that I, FRANK RYAN, a citizen of the United States, residing at Springfield, in the county of Sangamon and State of Illinois, have invented a certain new and useful Adjustable Mirror for Bicycles, of which the following is such a full, clear, and exact description as will enable those skilled in the art to which it pertains to make and use my said invention.

The purposes of my invention are to provide simple and effective means whereby a mirror may be adjustably supported on a bicycle in front of the rider, so as to enable the rider to note the approach of vehicles from the rear in time to avoid collision, and to provide a mirror and supporting-arms so constructed and arranged that the arms may be extended and turned either to the right or the left when the mirror is in use, and may be compactly folded against the head of the bicycle-frame, so as not to interfere with the use of the bicycle and so as to avoid injury to the mirror.

With these ends in view my invention consists of certain novel features of construction and combinations of parts shown in the annexed drawings and hereinafter particularly described and specifically claimed.

In the drawings, to which reference is hereby made, Figure 1 is a perspective view of the adjustable mirror in its extended position on the bicycle-frame. Fig. 2 is an enlarged rear elevation of the mirror-frame and the hinged arms supporting same. Fig. 3 is an enlarged detached side elevation showing part of the bicycle-frame and the adjustable mirror in its folded position on the frame. Figs. 4 and 5 are a top plan and side elevation, respectively, of the annular clamp. Fig. 6 is an enlarged vertical transverse section through the mirror and connected parts on the line 6 of Fig. 2. Fig. 7 is an enlarged plan and transverse sectional view showing one face of one of the arms, also showing one of the gaskets in position on the arm.

Similar letters of reference designate like parts in all of the views.

The mirror A is preferably circular in form and is contained in a suitable frame A'. On the back of the frame A' is a socket $a^2$, in which the ball member $A^2$ fits. The upper end of the upper member B of the hinged arm fits in a fork $a^5$ in the ball member $A^2$ and turns on a bolt $a^3$, passing through the arm and the ball member and having a thumb-nut $a^4$, which may be screwed down to clamp the arm in any desired position in the fork. In the back A' is a slot $a'$. A screw $a^2$ passes through the slot and screws into the ball member $A^2$. This screw connects the member $A^2$ with the plate A' and serves to keep the ball in the socket and to guide and limit the movement of the socket on the ball. The members B of the hinged arm are all substantially alike, except that the upper end of the upper member is shaped to fit in the fork $a^5$ and the lower end of the lower member is screw-threaded and screws into the spherical part of plug D.

The abutting disk-shaped ends $b$ of the members B have central holes $b'$. Screws $b^4$, fitting in the holes $b'$, form adjustable pivotal connections between the members B.

The disk-shaped ends $b$ have central recesses $b^2$. Gaskets $b^3$, preferably of rubber, felt, or other elastic material, fit in the recesses $b^2$. When the ends $b$ of the members B are clamped together by the screws $b^4$, the gaskets in the ends of the members are in contact with each other and serve to prevent the members from turning too freely on the screw $b^4$, and yet hold them with sufficient firmness to prevent accidental displacement by the jolting of the bicycle.

The annular clamp E is made in two parts united by a hinge $e$, and has an integral lug $e'$, pierced by a hole $e^2$, in which the taper part $d$ of the plug D fits. Both members of the clamp E have extensions $e^4$. One of these extensions has a hole and the other a slot, through which a bolt $e^5$ passes, and the members are clamped together on the bicycle-head C by tightening the nut on the bolt $e^5$.

In detaching the clamp from the bicycle-head the nut on the bolt $e^5$ is loosened sufficiently to permit the withdrawal of the bolt from the slot, after which the members may be turned on the hinge $e$ and separated, so that the clamp may be readily removed from the bicycle-head.

The tapering part $d$ of the plug D fits in the hole $e^2$ on the lug $e'$. A washer $d'$ bears against the face of the lug $e'$ and a screw $d^2$ screws into the end of the taper part $d$ and connects the washer with the plug. By tightening the screw $d^2$ the taper part $d$ may be drawn into the hole $e^2$, so as to cause the part $d$ to bind in the hole sufficiently to normally support the weight of the mirror and the hinged arm, but not tight enough to prevent the plug from turning in the hole when pressure is exerted on the arm.

From the foregoing description it will be seen that the connections of the several parts are sufficiently rigid to normally retain the mirror in any position in which it may be placed, but not rigid enough to interfere with the manual adjustment of the mirror by the rider. It will also be seen that the clamp E may be turned on the bicycle-head to face the mirror, either to the right or left, and that the members of the supporting-arms may be readily adjusted, so as to vary the height or the inclination of the mirror, or may be folded down alongside the bicycle-head, as shown in Fig. 3, so that when not in use the mirror may occupy a position where it will not be liable to be broken and where it will not be in the rider's way, and yet will be conveniently accessible when it is needed for use.

I am aware that mirrors having rigid connections with bicycle-frames have been used. I am also aware that folding brackets for mirrors are in common household use. I therefore do not claim, broadly, a mirror attachable to a bicycle-frame; neither do I claim, broadly, the use of a folding arm, but I restrict my claims to the peculiar features of construction which facilitate the attachment of the mirror to the bicycle-frame, and the peculiar construction of the connections whereby I am enabled to so connect the parts that they will have sufficient rigidity to retain the mirror in any position in which it may be placed, but may be turned by hand to change the position of the mirror or to fold the supporting-arm alongside the bicycle-head.

Having fully described my invention, what I claim as new, and desire to secure by Letters Patent, is—

1. An adjustable mirror for bicycles consisting of a mirror, a frame inclosing said mirror and provided with a socket, a ball working in said socket and having a fork, a supporting-arm consisting of members having a pivotal connection with each other, the upper member of said arm having a hinge connection with said ball, a tapered plug secured to the lower member of said arm, a clamp attachable to a bicycle-frame and having a lug provided with a hole in which the taper part of said plug fits, and a screw and washer connecting said plug with said clamp, as set forth.

2. An adjustable mirror for bicycles consisting of a clamp attachable to a bicycle-frame, a folding arm connected with said clamp, said arm consisting of members having a pivotal connection with each other, said members also having disk-shaped recessed ends, gaskets fitting in the recesses in said members, a ball with which the upper member of the folding arm is connected, a mirror-frame having a socket in which said ball works, and a mirror supported in said frame as set forth.

3. In an adjustable mirror for bicycles, the combination of an annular clamp consisting of two members having a hinge connection with each other, each of said members having extensions, one of which has a hole and the other a slot in which a clamping-bolt fits; one of said members also having an integral lug pierced by a transverse hole; a folding arm consisting of members having a pivotal connection with each other, one of said members having a plug fitting in the transverse hole in the lug on said annular clamp; a bolt connecting the members of said annular clamp; and a mirror having a pivotal and a ball-and-socket connection with one of the members of said folding arm; as set forth.

In witness whereof I have hereunto subscribed, at Springfield, Illinois, this 31st day of July, 1895.

FRANK RYAN.

Witnesses:
JOHN McLEAN,
A. D. DU BOIS.